United States Patent [19]

Hagelthorn

[11] Patent Number: 5,795,037
[45] Date of Patent: Aug. 18, 1998

[54] CONTROLLED POSITION AXLE NUT SYSTEM AND METHOD TO PRELOAD TAPERED ROLLER BEARINGS

[75] Inventor: George Allan Hagelthorn, Dearborn, Mich.

[73] Assignee: Hub Nut Corporation, Lafayette, Ind.

[21] Appl. No.: 652,298

[22] Filed: May 23, 1996

Related U.S. Application Data

[63] Continuation-in-part of Ser. No. 203,827, Mar. 1, 1994.

[51] Int. Cl.$^6$ ............................................. B60B 21/00
[52] U.S. Cl. .................................. 301/124.1; 301/105.1; 384/517; 384/562; 411/131; 411/140; 411/216; 411/939
[58] Field of Search ........................... 301/105.1, 111, 301/114, 115, 124.1, 126, 131, 35.63, 35.55, 35.58, 112, 117, 118, 120, 122; 180/254, 258, 259; 29/898.07; 384/517, 540, 562, 563, 583; 411/114, 115, 129, 131, 132, 133, 140, 191, 216, 217, 197, 199, 939, 948

[56] References Cited

U.S. PATENT DOCUMENTS

| | | |
|---|---|---|
| 1,252,455 | 1/1918 | Lee . |
| 1,286,438 | 12/1918 | Smith . |
| 1,437,833 | 12/1922 | Buckwalter . |
| 1,811,679 | 6/1931 | Volet . |
| 2,110,126 | 3/1938 | Gannett . |
| 2,609,243 | 9/1952 | Ponnequin . |
| 3,125,897 | 3/1964 | Zeman . |
| 3,253,630 | 5/1966 | Phtelan .................... 411/197 |
| 3,290,071 | 12/1966 | Kusiak ..................... 411/129 X |
| 3,294,141 | 12/1966 | Scotthoefer et al. . |
| 3,464,474 | 9/1969 | Jansen ..................... 411/216 |
| 3,939,889 | 2/1976 | Bereznicki ................. 411/939 X |
| 4,530,144 | 7/1985 | Hagelthorn . |
| 4,613,240 | 9/1986 | Hagelthorn .................. 384/585 |
| 4,812,094 | 3/1989 | Grube ..................... 301/124.1 X |
| 5,174,839 | 12/1992 | Schultz et al. . |
| 5,190,355 | 3/1993 | Hobbie et al. . |
| 5,533,794 | 7/1996 | Faison ...................... 301/105.1 |
| 5,573,311 | 11/1996 | Clohessy ................... 301/105.1 |

FOREIGN PATENT DOCUMENTS

| | | | |
|---|---|---|---|
| 193136 | 1/1931 | France ..................... 301/105.1 |
| 41616 | 1/1880 | Germany ................... 301/105.1 |
| 1880 | of 1900 | United Kingdom ........... 301/105.1 |
| 20638 | of 1904 | United Kingdom ........... 301/105.1 |
| 199494 | 6/1923 | United Kingdom ............ 384/583 |
| 1023637 | 3/1966 | United Kingdom ............ 384/517 |

*Primary Examiner*—Russell D. Stormer
*Attorney, Agent, or Firm*—Trexler, Bushnell, Giangiorgi & Blackstone, Ltd.

[57] ABSTRACT

A novel axle nut system is provided on the spindle ends of an axle which mounts a wheel assembly that includes tapered roller bearings. The axle nut system of the present invention includes an adjustment nut, a washer and a retainer member. The adjustment nut is threaded into position having torque applied to it in a controlled manner to achieve specific preload bearing pressure against the outer bearings. Thereafter, the washer is placed into contact with the nut and is rotationally fixed with respect to the axle. Next, the threaded retainer member is rotated into contact with the washer. With the threaded retainer member placed on the axle to prevent any outward movement of either the wheel assembly components or the adjustment nut and washer, the adjustment nut is rotated in the opposite direction by which it was installed until it jams forcibly against the washer and thus, the threaded retainer member. With this rotational movement of the adjustment nut, the original bearing pressure or preload exerted outward against the adjustment nut is transferred and bears against the washer and retainer member.

20 Claims, 7 Drawing Sheets

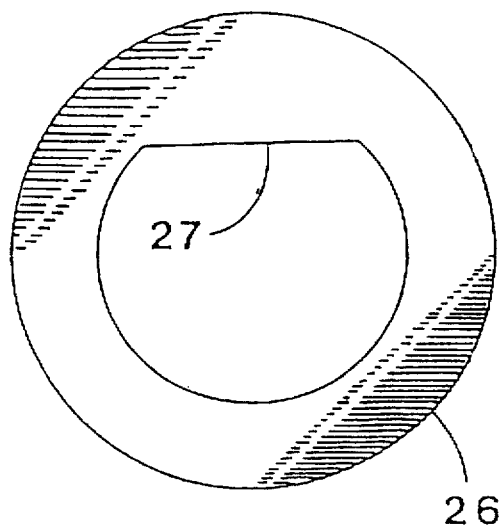
FIG. 19
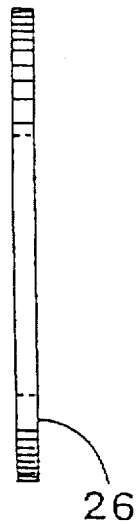
FIG. 20
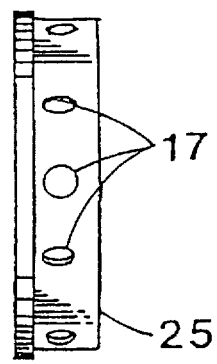
FIG. 21
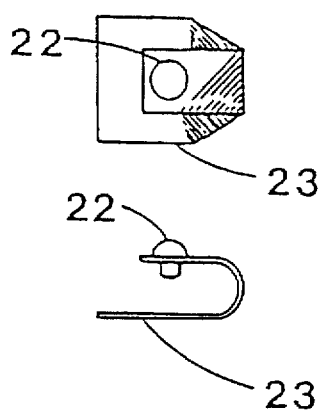
FIG. 22
FIG. 23

CONTROLLED POSITION AXLE NUT SYSTEM AND METHOD TO PRELOAD TAPERED ROLLER BEARINGS

This patent application is a continuation-in-part application of U.S. patent application, Ser. No. 08/203,827 filed on Mar. 1, 1994 and allowed on Mar. 14, 1996.

BACKGROUND OF THE INVENTION

The need for means to safely install wheels on tractor/ trailer combination vehicles has long been recognized and numerous solutions have been made available. However, these solutions are limited in application because they are of a single nut design without the means to be rigidly fixed and secured in position on the axle spindle.

In 1962, a major producer of highway trailers introduced a new industry axle having a wheel retention system consisting of a single nut held in place by a cotter pin. At that time, there was no interest in providing an axle nut system which could be adjusted for specific amounts of preload; a compressive force on the bearings, because the tapered roller bearing manufacturers did not advocate advantages would occur with that type of installation. The technique of wheel installation with that trailer manufacturer's single nut design was merely to tighten the wheel assembly in place and then back off the single nut to a position of loose clearance before placing a cotter pin in position to prevent rotational movement. The disadvantages of this arrangement soon materialized with a rash of "lost wheels" resulting in many disastrous accidents. Investigations showing the single axle nut marketed by this trailer manufacturer were unsafe for a number of reasons and the following conclusion issued by the National Highway Traffic Safety Administration: "Analysis reveals that a problem did exist which (the company) should have addressed with a safety recall in 1984". For specifics regarding this issue, attention is invited to the NHTSA Engineering Analysis Action Report EA88-024, dated Jun. 5, 1989.

Subsequent to the publication of the National Transportation Safety Board Special Investigation Report, NTSB/ SIR92/04, PB92-917004, adopted Sept. 15, 1992, which detailed accounts of lost wheel incidents, recommendations were directed to the attention of the American Trucking Association specifying the need to "Promote an educational program on proper wheel tightening procedures through carriers, manufacturers, government".

Recognizing the need for remedial action, efforts were initiated leading to the development of this invention. Coupled with this recognition was the awareness of industry's progress to improve tapered roller bearing adjustment. With this stimulation, the controlled position axle nut system of the present invention was conceived and tested with substantiating results.

Because a potential weakness with all single nut designs produced for the industry is the inability to consistently eliminate all degrees of freedom between the threads of the spindle and those of the nut, it was part of the initial parameters to develop a retention system configured with jamming members to control this problem. In the course of development, several tapered roller bearing manufacturers advised that a controlled amount of preload within the tapered roller bearings wheel assembly was not only acceptable, but it would be recommended if an accurate means could be achieved for that purpose.

Until the time of this invention, no double nut configuration was capable of being installed on the axles of tractor/ trailer combination vehicles with the means of providing any measure of controlled preload on the tapered roller bearings. In achieving the final jammed condition between the two nuts involved, it was always the case that the outer nut had to be tightened against the inner nut and during that process, additional pressure was brought to bear against the bearings. The amount of additional preload pressure was relative to the amount of thread clearance which existed between the threads of the inner nut and the threads of the spindle. The tolerances of manufactured threads on axle nuts were so variable that inconsistent preload pressures would occur as a result of the inward movement of the inner nut through the space or lash between mating threads as the outer nut was tightened into the jammed condition. For this reason, the recommended practices by all manufacturers for installation of double nuts on tractor/trailer applications call for a back off of the inner nut prior to installing and tightening the outer nut.

With the present invention, it is now possible to apply a specific amount of preload and to retain that pressure on the bearings during the subsequent and final tightening operation. An additional advantage of the present invention is its ability to install and maintain a specific amount of clearance between the bearing and the retention members if so desired.

OBJECTS AND SUMMARY OF THE INVENTION

An object of this invention is to provide an apparatus and a method to place wheel assemblies on axles which includes a primary means to apply a specific amount of installation pressure, known as "preload", to the tapered roller bearings while being able to maintain that original bearing pressure or adjustment as the assembly is being secured with a secondary means to effect a jammed condition of both means on the axle threads.

Another object of this invention is to provide a solution using those same components which were designed to provide controlled "preload" within the wheel assembly to accommodate a need for measured clearance between the outer tapered wheel bearing and the retention members.

Further, another object of this invention is to offer recommendations on how its principles can be applied to all conventional axles currently in use explaining how all existing axles can be retrofitted without alterations merely by replacing the fasteners.

Continuing, another object of this invention is to provide the solution for a recognized industry problem; specifically the need to replace the single nut/cotter pin configuration which has been shown to be unreliable and unsafe on the highway.

Still further, another object of this invention is to make it possible to employ wheel retention threaded components such as nuts with threads of excessive tolerance without compromising the integrity of the bearing adjustment procedures.

Accordingly, another object of the present invention is to provide a double fastener combination which, after the adjustment nut has been installed using conventional torque wrenches, provides for an outer member which is brought to bear against the inner adjustment nut by the mechanic or installer manually to a finger tight condition. Intentionally, in several embodiments of the present invention, the outer member is not equipped with means to apply torque using a wrench or tool by which excessive pressure can be brought to bear against the adjustment nut. The purpose served in this instance is to prevent the positioning of the outer means in such a way as to increase the preload force applied by the adjustment nut against the tapered roller bearings. In at least one embodiment, however, the outer member is provided as a conventional nut. In this embodiment, the installation is performed by skilled technicians who would not incorrectly perform the novel method of assembly disclosed herein.

A further object of the present invention is to satisfy the need for a reliable and safe wheel assembly installation on tractor/trailer combination vehicles providing the advantages of precise adjustment without incurring excessive cost for precision parts.

Briefly, the present invention comprises a novel axle nut system provided on the spindle ends of an axle which mounts a wheel assembly that includes tapered roller bearings. The axle nut system of the present invention includes an adjustment nut, a washer and a retainer member. The adjustment nut is threaded into position having torque applied to it in a controlled manner to achieve specific preload bearing pressure against the outer bearings. Thereafter, the washer is placed into contact with the nut and is rotationally fixed with respect to the axle. Next, the threaded retainer member is rotated by finger tightening into contact with the washer. With the threaded retainer member placed on the axle to prevent any outward movement of either the wheel assembly components or the adjustment nut and washer, the adjustment nut is rotated in the opposite direction by which it was installed until it jams forcibly against the washer and thus, the threaded retainer member. With this rotational movement of the adjustment nut, the original bearing pressure or preload exerted outward against the adjustment nut is transferred and bears against the washer and retainer member. The rotationally fixed washer prevents the transmission of torsion forces to the retainer member from the adjustment nut as it is being jammed thereby preventing outward movement of the assembly during the jamming operation.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 19 shows a "D" washer used in conjunction with the milled axle spindle as shown in FIGS. 17 and 18;

FIG. 20 is a side view of the "D" washer shown in FIG. 19;

FIG. 21 is a side view of a lock ring used in conjunction with the milled axle spindle shown in FIGS. 17 and 18, such lock ring being a modified form of that shown in FIG. 8 in order to allow placement of the locking member from the side to engage one of the index holes as well as serving as an interference member in the cavity between the milled surface of the axle spindle and the inner surface of the lock ring;

FIG. 22 is a top elevational view of the locking member which serves to secure the outer means or lock ring with respect to the axle spindle after being placed in position against the inner means or nut;

FIG. 23 is a side elevational view of the locking member shown in FIG. 22;

DETAILED DESCRIPTION OF THE PREFERRED EMBODIMENT

Figure 1:
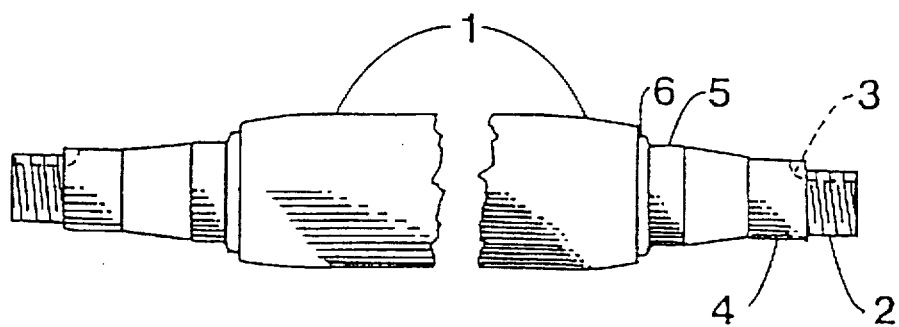
FIG. 1 is a plan view of an axle beam without any accouterments showing the two spindles in final form following the machining operations.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
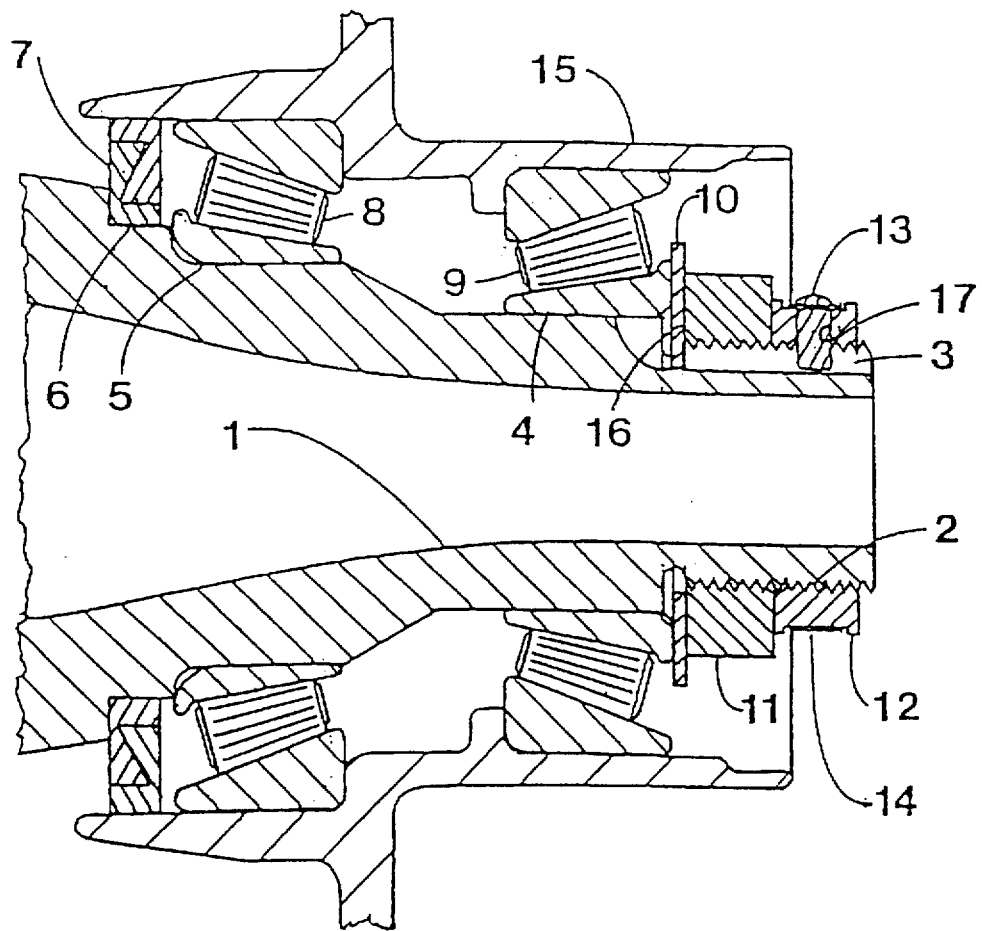
FIG. 2 is a section view of the axle spindle in FIG. 1 having assembled thereon the components comprising the wheel and axle assembly, which includes an inner means, an outer means and a locking member, showing the respective relationship of all members in their final assembled positions.
Figure 3:
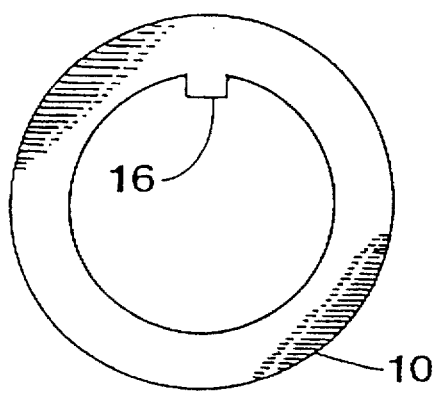
FIG. 3 is a plan view of a stationary washer which is positioned on the axle between the inner means and the inner race of an outer tapered roller bearing.
Figure 4:
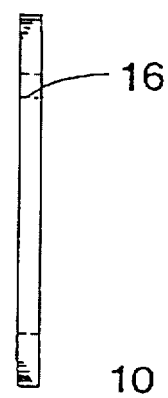
FIG. 4 is a side view of the stationary washer shown in FIG. 3.
Figure 5:
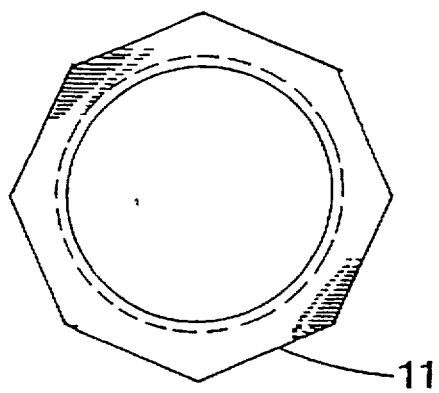
FIG. 5 is a plan view of the inner means, which is depicted as a nut.
Figure 6:
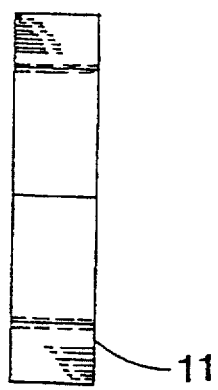
FIG. 6 is a side view of the nut shown in FIG. 5.
Figure 7:
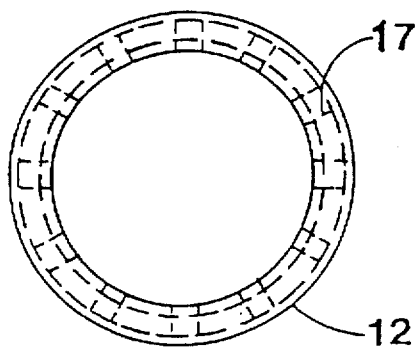
FIG. 7 is a plan view of the outer means shown as a ring having an annular slot to accommodate a locking member and shown with a plurality of holes to accept the locking member having a projection which extends into an axle spindle keyway serving to secure the outer means at a selected position.
Figure 8:
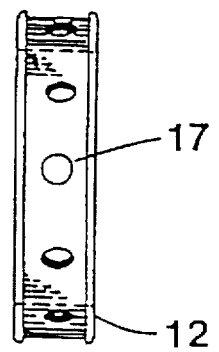
FIG. 8 is a side view of the outer means shown in FIG. 7.
Figure 9:
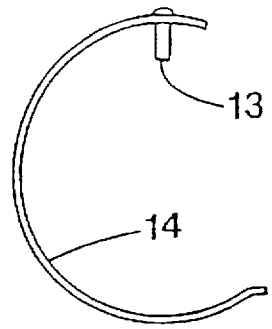
FIG. 9 is a plan view of the locking member which assembles to the outer ring shown in FIG. 7.
Figure 10:
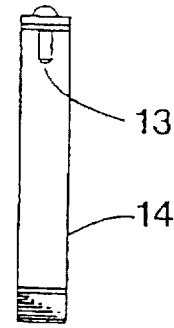
FIG. 10 is a side view of the locking member shown as FIG. 9.

In FIG. 1, an axle beam 1 is provided with conventional threads 2, a washer keyway 3, an outer bearing journal 4, an inner bearing journal 5, and an oil seal surface journal 6. Referring to FIG. 2, an oil seal 7 is shown in its respective position mounted between wheel or hub 15 and axle spindle 1 inner tapered roller bearing 8 is positioned between the wheel or hub 15 and the bearing journal 5. An outer tapered roller bearing 9 is also positioned in its working arrangement between the wheel or hub 15 and the outer bearing journal 4 of the axle spindle 1.

Attention is now directed to FIG. 2 which illustrates the preferred embodiment of the invention in its assembled form with the axle spindle 1, and FIGS. 3–10, which illustrate the components which form the invention. The threads 2 of the axle spindle 1 accommodate an adjustment nut 11, shown in FIGS. 5 and 6, and a threaded lock ring 12, shown in FIGS. 7 and 8. The washer keyway 3 serves to engage an inner projection 16 of a tabbed washer 10, which is shown in detail in FIGS. 3 and 4, and an interference member 13, which is part of the retainer clip 14, both of which are shown in detail in FIGS. 9 and 10.

The assembly process provides for placement of the tabbed washer 10 around the threaded diameter 2 of the axle spindle 1 with the tabbed washer's internal projection 16 engaged with the keyway 3 followed by placement of the adjustment nut 11 in position to be tightened with a specific amount of torque applied by a calibrated torque wrench (not shown). The amount of installation torque applied by the torque wrench complies with recommendations which correlate with the relative amount of preload pressure against the inner and outer tapered roller bearings 8 and 9 advocated by bearing manufacturers for reliable and safe operations. Having established the desired preload bearing pressure by controlled tightening of the adjustment nut 11, the threaded lock ring 12 is finger tightened against the inner face of the inner adjustment nut 11 and secured relative to that position with respect to the axle spindle 1 using the retainer clip 14, shown in FIGS. 9 and 10. When the retainer clip 14 is used, the interference projection 13 extends through one of the annular index holes 17, shown in FIG. 8, of the threaded lock ring 12 to engage the axle spindle keyway 3. The placement of the threaded lock ring 12 in this manner establishes a spatial relationship between its inner face and the outer face of the tapered roller bearing 9 with this space being controlled and maintained by the physical unchanging thickness of the washer 10 and the inner adjustment nut 11.

The amount of preload pressure against the outer bearing 9 introduced by the torque controlled installation of the inner adjustment nut 11 is retained as long as the space occupied by the washer 10 and the adjustment nut 11 between the threaded lock ring 12 and the inner bearing 9 remains unchanged. By again applying a torque wrench to rotate the inner adjustment nut 11 in the reverse direction from which it was originally installed with controlled torque, the equal and opposite preload force acting through the threads of the inner adjustment nut 11 is transferred from its contact against the threads 2 of the axle spindle 1 into bearing contact is with the inner face of the threaded lock ring 12. This rotated juxtapositional movement of the inner adjustment nut 11 redistributes the outward preload force, without change, from the threads of the inner adjustment nut 11 to the threads of the threaded lock ring 12. As rotational movement of the adjustment nut 11 continues in the direction that would normally loosen it, the relative position of its threads change with respect to those of the axle spindle 1, but the axial position of the adjustment nut 11 does not change because the stationary and secured threaded lock ring 12 physically prevents any outward movement. Reversed rotational movement of the inner adjustment nut 11 can continue until contact between the threads of the inner adjustment nut 11 and the threads 2 of the axle spindle 1 transfers from the outboard thread faces to the inboard thread faces. The amount of rotational movement before this change of thread contact occurs depends on the space between the mating threads sometimes described as "lash". Manufacturing tolerances dictate the amount of lash that will be experienced and this is generally defined, for example, by categorizing the threads as Class 1, Class 2, or Class 3. Variations of the amount of lash present between the threads of the inner adjustment nut 11 and the axle spindle threads 2 do not alter the ability of this invention to effect a controlled amount of tapered roller bearing preload after the inner adjustment nut 11 has been forcibly tightened into a jammed condition with the threaded lock ring 12 because retention of the originally installed preload depends on maintaining the spatial relationship between the outer face of the inner race of the outer bearing 9 and the inner face of the threaded lock ring 12. This spacing remains unchanged following installation of the threaded lock ring 12 because the physical thickness of the washer 10 and the inner adjustment nut 11 does not vary. After an ideal jammed condition has been applied between the adjustment nut 11 and the threaded lock ring 12 in accordance with the manufacturer's recommendations, the wheel 15 has now been positioned on the axle spindle 1 and the desired amount of preload originally applied by the calibrated torque wrench is perpetuated in the tapered roller bearing 8 and 9 in the wheel 15 and axle spindle 1 assembly. Since the inner adjustment nut 11 is positioned against the threaded lock ring 12, the nut 11 is retained against retrograde axial movement.

Having described the preferred embodiment, an alternate embodiment, as shown in FIGS. 11–15, is additionally described for the reason that it is a design specifically applicable to retrofitting numerous industry axles currently in use in highway operations. Some of these axles were identified by the National Highway Traffic Safety Administration as the type which should have been recalled by virtue of having single axle nuts with manufacturing deficiencies.

Figure 11:
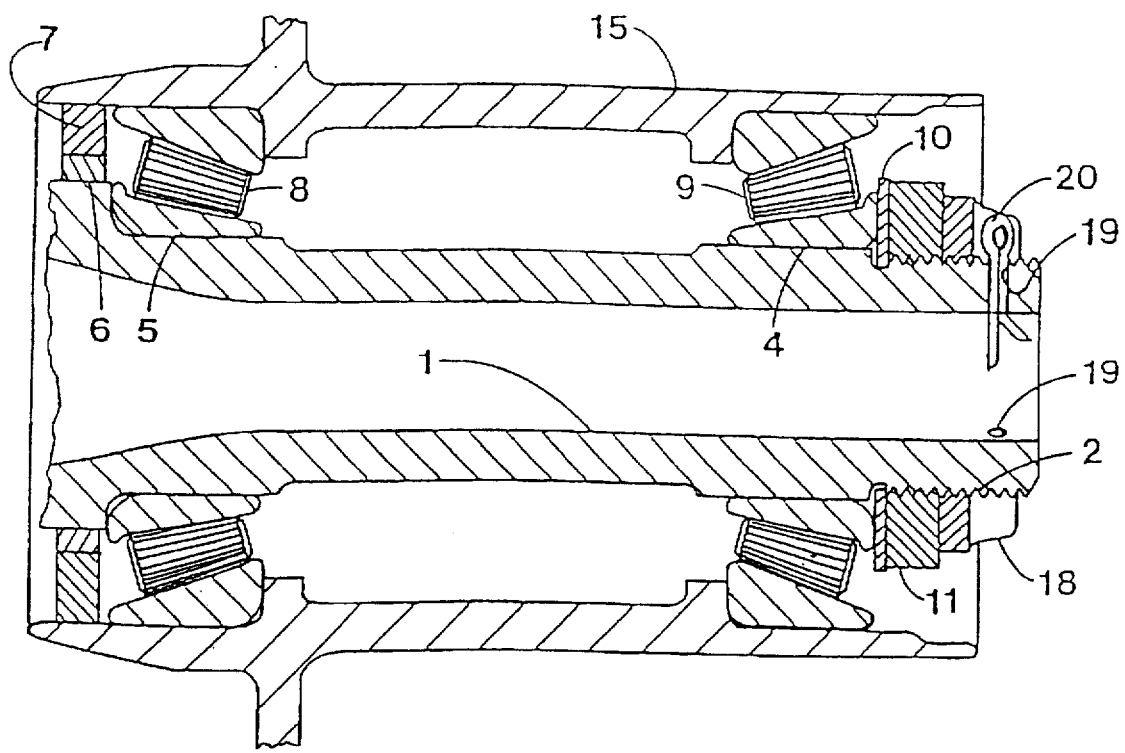
FIG. 11 is a cross-sectional view of an alternate embodiment of the present invention which is used to retrofit existing axles having single nuts which functions in the same manner as the embodiment shown in FIG. 2, but has variations of the inner means and the outer means with the outer means being positioned and secured with a cotter pin.
Figure 12:
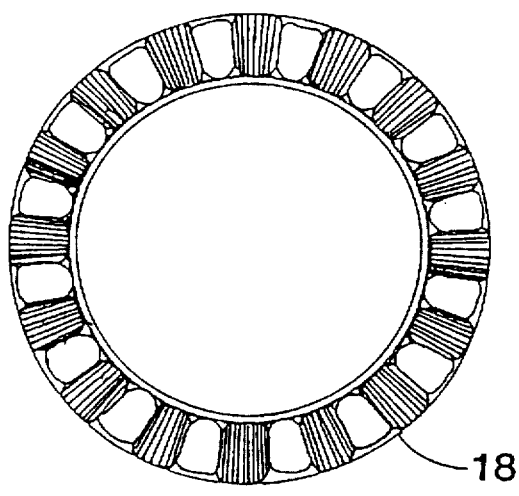
FIG. 12 is a plan view of a castellated outer member or lock ring used in conjunction with a cotter pin as shown in FIG. 11.
Figure 13:
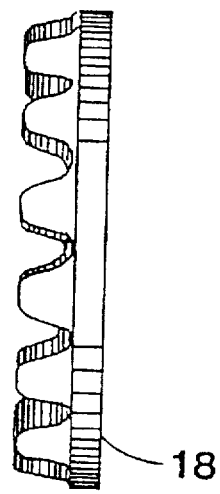
FIG. 13 is a side view of the castellated lock ring shown in FIG. 12.
Figure 14:
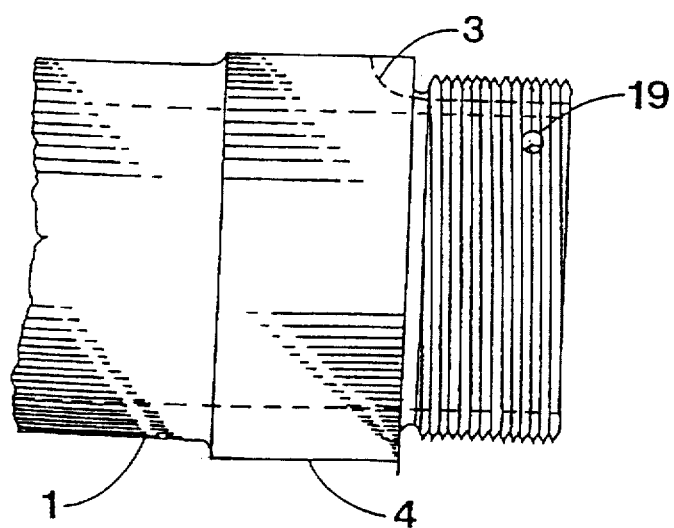
FIG. 14 shows a side elevational view of a typical axle spindle currently in use which can be retrofitted using the inner and outer means shown in FIGS. 5 and 12.
Figure 15:
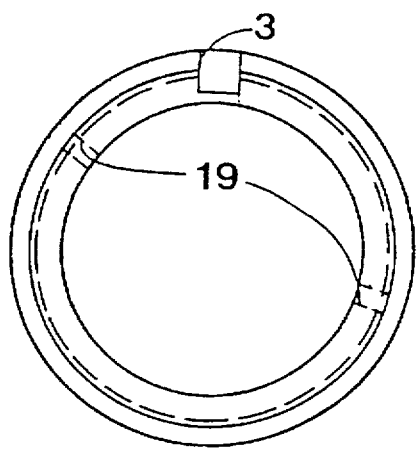
FIG. 15 is an end view showing a keyway and two holes which accommodate the cotter pin used to position and secure the outer castellated lock ring on the axle spindle shown in FIG. 11.

With reference to FIG. 11, an industry axle 21 on which a hub 15 is mounted is shown. The components mounted on the industry 21 are identical with the exception of the design of a threaded lock ring 18, shown in FIGS. 12 and 13, which differs from the design of the threaded lock ring 12 used in the preferred embodiment shown in FIGS. 7 and 8. In lieu of using the retainer clip 14 having the interference member 13 to secure the threaded lock ring 18, a cotter pin 20 is placed in a castellation cavity shown in FIG. 13 of the threaded lock ring 18 through one of two existing holes 19 in the axle spindle shown in FIG. 15 to securely position the threaded lock ring 18 with respect to the axle spindle 21. At this point in the assembly process, the subsequent steps to be taken are as described in the procedure described for the preferred embodiment; specifically, rotating the inner adjustment nut 11 in the reverse direction by which it was originally installed with controlled torque and completing the assembly process as earlier described.

Figure 16:
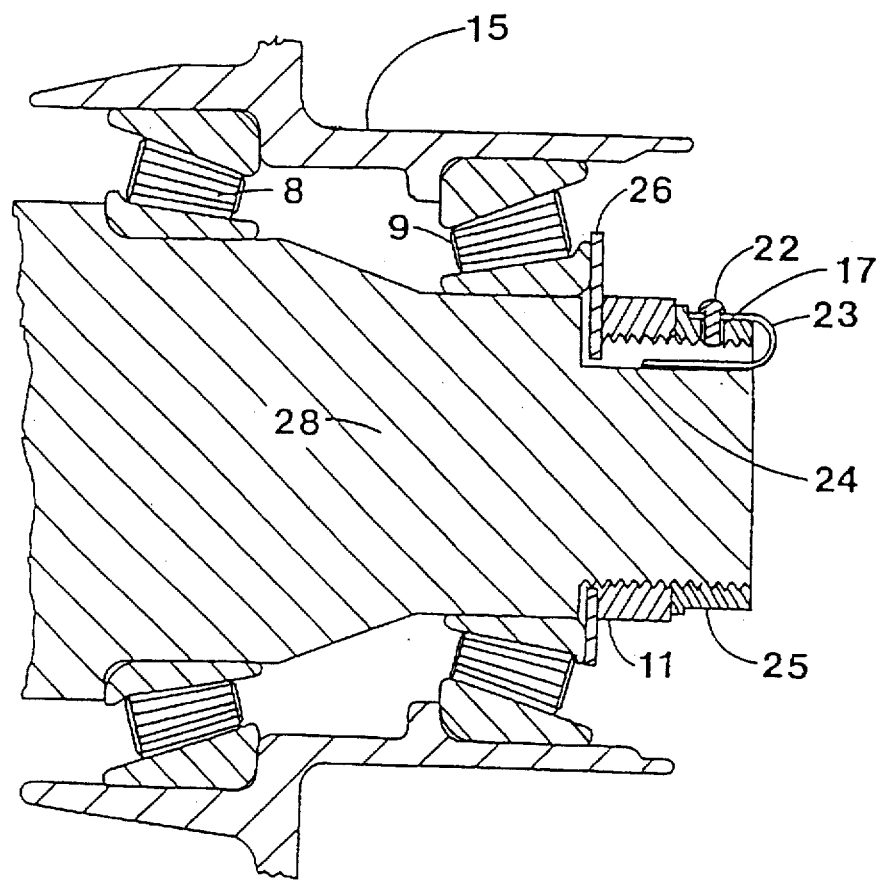
FIG. 16 is a partial cross-sectional view of a second alternate embodiment which is capable of being used to retrofit a different type of spindle sometimes used on the steering axles of automobiles and truck/tractors showing the method by which the original fasteners on an axle spindle having a milled flat can be replaced by using a variation of the inner means shown in FIG. 5, a "D" washer shown in FIG. 19, a modified outer means shown as FIG. 21, and a different locking member shown as FIG. 22.

As shown in FIGS. 16–22, a second alternate embodiment is provided in order to provide controlled preload on another basic type of axle spindle. Having been informed by one manufacturer that their interests would be served if the preferred embodiment could be modified to retrofit axle spindles having a milled flat 24 such as described in FIGS. 16–18, this need was addressed as shown in FIG. 16. In this embodiment, tabbed washer 10 is replaced with washer 26 as illustrated in FIGS. 19 and 20. Washer 26 is a "D" washer having a flat segment 27 on its inner diameter that mates with the milled flat 24 on the axle spindle 28 making it impossible for it to rotate. In addition, the threaded locking ring 12 is replaced with lock ring 25 shown in FIG. 21.

The wheel 15 assembly mounting on the axle spindle 28 in this embodiment is accomplished by using the same procedure described for the preferred embodiment shown in FIG. 2. Following placement of the washer 26 in position adjacent to the outer tapered roller bearing 9, installing the adjustment nut 11 with controlled torque using a calibrated torque wrench to apply the desired preload pressure to the tapered roller bearings 8 and 9, a modified threaded lock ring 25 is positioned in finger tight contact with the adjustment nut 11 after which retainer 23, as shown in FIG. 22, is placed within the cavity described by the inner diameter of the threaded lock ring 25 and the milled flat 24 on the axle spindle. Moving the retainer clip 23 deeper into the aforementioned cavity, it becomes possible to engage its interconnecting member 22 into one of the annular index holes 17 in the threaded lock ring 25 which, coupled with the interlock provided by the lower portion of retainer 23 wedging in the space between the inner diameter of the threaded lock ring and the milled flat 24 of the axle spindle, secures the threaded lock ring 25 with respect to the axle spindle 28. Following this operation, the adjustment nut 11 is rotated in reverse rotation from that with which it was initially tightened until it becomes jammed against the threaded lock ring 25 in accordance with the manufacturer's recommendations. As before, the desired amount of preload originally applied by the calibrated torque wrench is perpetuated in bearings 8 and 9 of the wheel 15 and axle 28 assembly.

Figure 24:
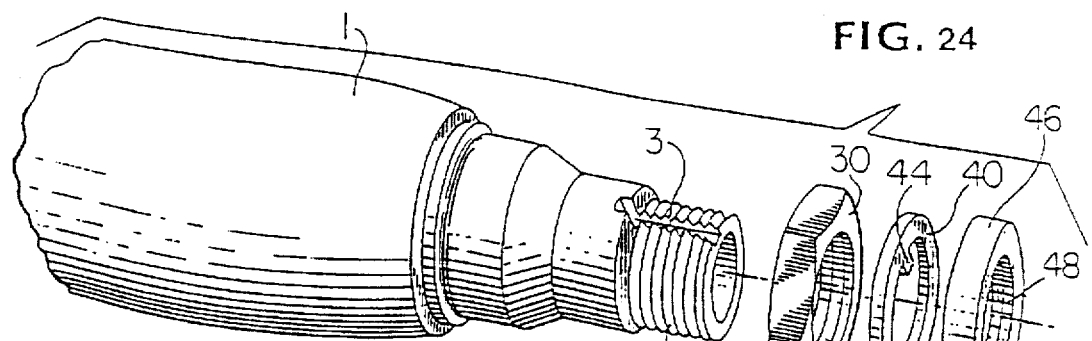
FIG. 24 is an exploded perspective view of the components of a third alternate embodiment of the axle nut system of the present invention which includes an adjustment nut, a washer and a retainer member.
Figure 25:
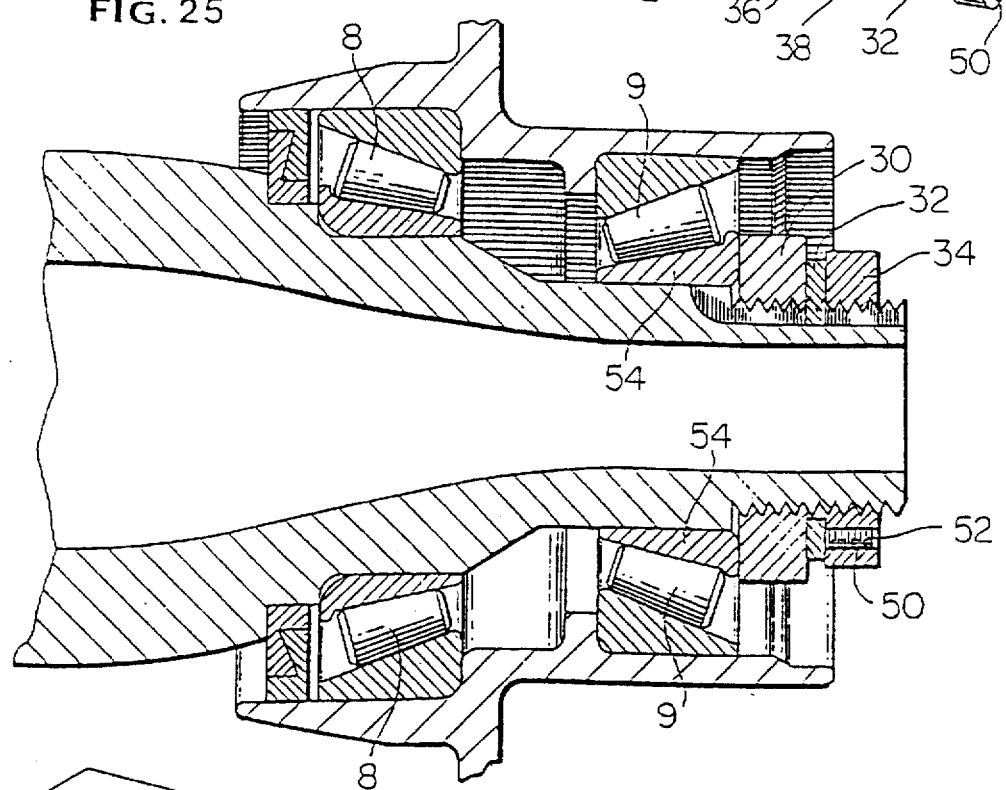
FIG. 25 is a partial, cross-sectional view of the axle nut system shown in FIG. 24 in an assembled condition and after the adjustment nut has been jammed on the spindle end.

Attention is now directed to FIGS. 24 and 25 which show a third alternate embodiment of the present invention. This embodiment of the invention includes an adjustment nut 30, like the adjustment nut 11 shown in FIGS. 5 and 6, a tabbed washer 32, like the tabbed washer 10 shown in FIGS. 3 and 4, and further includes a retainer member 34. This third alternate embodiment may be used on an axle assembly identical to that as described with respect to the first, preferred embodiment. For details of the specifics of the axle assembly, attention is directed to the first embodiment.

The third alternate embodiment of the axle nut system is used to maintain the position of the retainer member 34 during the introduction of an outward axial force by the inner adjustment nut 30 as the adjustment nut 30 is being secured on the threaded end portion 2 of the axle spindle 1 into a jammed condition, viz., as the adjustment nut 30 is rotated in the opposite direction to which it was initially installed.

As shown in FIG. 24 (and as shown in the previous embodiments), the adjustment nut 30 is of a conventional design having an outer surface 36 suitable for engagement by a tool or torque wrench and an inner threaded aperture 38. Further, as shown in FIGS. 24 and as shown in the previous embodiments, the washer 32 includes an inner portion 40 providing an unthreaded aperture therethrough and an inner projection 44 which extends from the inner portion 40 inwardly toward the center of the aperture.

As shown in FIG. 24, the retainer member 34 used in the third alternate embodiment is a ring having smooth outer surface 46 and a threaded aperture 48 therethrough. A threaded through hole 50 is provided through the retainer member 34 and extends through the retainer member 34 in the same direction as the threaded aperture 48. A set screw 52 is provided for engagement through the threaded hole 50 as described herein.

The adjustment nut 30, the tabbed washer 32 and the retainer member 34 are mounted on the threaded end portion 2 of the axle spindle 1. In this embodiment, the adjustment nut 30 directly abuts against the inner race 54 of the outer tapered roller bearing 9 instead of the washer directly abutting against the inner race of the outer tapered roller bearing as is performed in the previous embodiments.

To assemble the system on the threaded end portion 2 of the axle spindle 1, the inner adjustment nut 30 is placed on the spindle 1 and is rotated and tightened against the inner race 54 of the outer tapered roller bearing 9 with a specific amount of torque applied by a calibrated torque wrench (not shown) to apply a selected preload pressure against the outer tapered roller bearing 9. The amount of installation torque applied by the torque wrench complies with recommendations which correlate with the relative amount of preload pressure against the inner and outer tapered roller bearings 8, 9 advocated by bearing manufacturers for reliable and safe operations.

After the desired preload has been placed on the tapered roller bearings 8, 9 by controlled tightening of the adjustment nut 30 against the inner race 54 of the bearing 9, the washer 32 is placed on the spindle such that the projection 44 is engaged in the keyway 3 and the washer 32 abuts against the outer face of the adjustment nut 30. Because of the engagement of the projection 44 in the keyway 3, the washer 32 is fixed against rotation with respect to the end portion 2 of the axle spindle 1.

Thereafter, the retainer member 34 is placed on the spindle end 2 and rotated against the outer face of the washer 32 by finger tightening. The smooth outer surface 46 of the retainer member 34 promotes the use of finger tightening because a tool cannot be easily engaged with the retainer member 34. After the retainer member 34 is placed on the end portion 2, a spacing is defined between the retainer member 34 and the outer bearing 9 as provided by the thicknesses of the adjustment nut 30 and the washer 32.

The amount of preload pressure against the outer bearing 9 introduced by the torque controlled installation of the adjustment nut 30 is retained as long as the space occupied by the adjustment nut 30 and the washer 32 between the retainer member 34 and the outer bearing 9 remains unchanged. By again applying a torque wrench to rotate the adjustment nut 30 in the reverse direction from which it was originally installed with is controlled torque, the equal and opposite preload force acting through the threads of the adjustment nut 30 is transferred from its contact against the threads of the axle spindle 1 into bearing contact with the washer 32 which places the washer 32 into bearing contact with the retainer member 34. As was effected in the previous embodiments, this rotated juxtapositional movement of the adjustment nut 30 redistributes the outward preload force, without change, from the threads of the adjustment nut 30 to the threads of the retainer member 34. As rotational movement of the adjustment nut 30 continues in the direction that would normally loosen the nut 30, the relative position of its threads change with respect to those of the axle spindle 1, but the axial position of the adjustment nut 30 does not change because the washer 32 and retainer member 34 physically prevent outward movement of the adjustment nut 32. As is effected in the previous embodiments, reversed rotational movement of the adjustment nut 30 continues until contact between the threads of the adjustment nut 30 and the threads of the axle spindle 1 transfers from the outboard thread faces to the inboard thread faces thereby jamming the adjustment nut 30 with respect to the spindle 1. Because of this reverse rotational movement of the adjustment nut 30, the adjustment nut 30 is converted from a load bearing fastener to that of a spacer, and its new purpose is to control the spatial relationship between the inner race 54 of the outer bearing 9 and the threaded retainer member 34.

Because the tabbed washer 32 cannot be rotated relative to the axle spindle 1, the tabbed washer 32 prevents the transmission of torsion forces from the adjustment nut 30 to the retainer member 34 as the adjustment nut 30 is rotated in the reverse direction from which the adjustment nut 30 was originally tightened, thereby preventing any rotational movement of the retainer member 34 due to these torsion forces. Thus, the placement of the tabbed washer 32 between the adjustment nut 30 and the retainer member 34 causes the position of the retainer member 34 to be maintained with respect to the axle spindle 1 during the reverse rotation of the adjustment nut 30. Moreover, like that of the previous embodiments, the retainer member 34 has an outer diameter which is less than the diameter of the adjustment nut 30 so that when the torque wrench is engaged with the adjustment nut 30 to jam it, the retainer member 34 is not accidentally engaged by the wrench which would allow the retainer member 34 to rotate and upset the predefined spacing between the retainer member 34 and the outer bearing 9.

To provide a redundant restraint to prevent rotation of the retainer member 34 following the reverse rotation and jamming of the adjustment nut 30, the retainer member 34 may be secured with respect to the axle spindle 1 by tightening the set screw 52 through the threaded hole 50 in the retainer member 34 thereby bringing pressure to bear against the tabbed washer 32. This action will serve to lock the retainer member 34 against the rotationally fixed tabbed washer 32.

Figure 26:
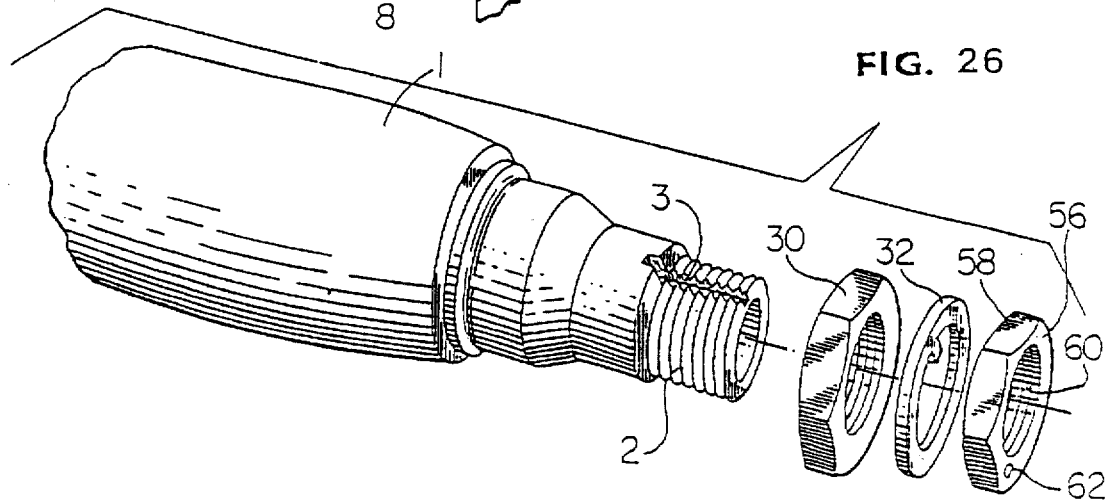
FIG. 26 is an exploded perspective view of the components of a fourth alternate embodiment of the axle nut system of the present invention which includes an adjustment nut, a washer and a retainer member, such retainer member being a conventional nut.

A fourth alternate embodiment of the novel axle nut system of the present invention is shown in FIG. 26. This embodiment of the invention is identical to the third alternate embodiment shown in FIGS. 24 and 25, except that the retainer member 34 is replaced by a conventional nut 56 which has an outer surface 58 that can be engaged by a tool or torque wrench and an inner threaded aperture 60. A threaded through hole 62 and a set screw (not shown), like that shown in the embodiment shown in FIGS. 24 and 25, may be provided through the retainer nut 56. To place the retainer nut 56 on the end portion 2 of the axle spindle 1, the retainer nut 56 is rotated into contact with the washer 32 with torque less than the specific amount of torque applied initially to tighten the inner adjustment nut 30, such as by using a tool or by finger tightening. This fourth alternate embodiment is particularly suited for use to preload tapered roller bearings at the end of a transmission shaft assembly of a heavy duty truck.

When using this embodiment, the retainer member may be a conventional nut 56 because the work is performed in strictly controlled assembly areas by trained technicians who would not likely use incorrect procedures. Therefore, the possibility of rotating the retainer nut 56 into contact with the washer 32 in such as manner so as to provide a compressive force on the bearings is minimal. Moreover, the retainer nut 56 has an outer diameter which is less than the diameter of the adjustment nut 30 so that when the torque wrench is engaged with the adjustment nut 30 to jam it, the retainer nut 56 is not accidentally engaged by the wrench which would allow the retainer nut 56 to rotate and upset the predefined spacing between the retainer nut 56 and the outer bearing 9.

Figure 17:
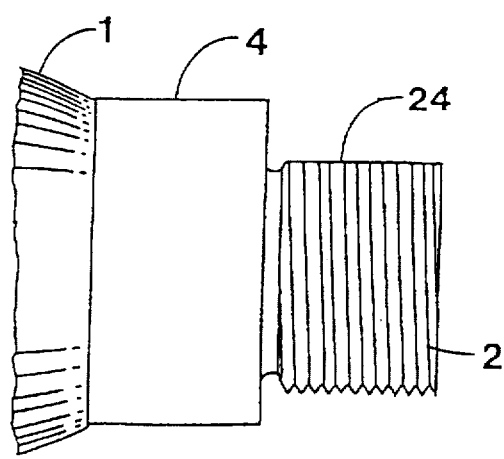
FIG. 17 shows a longitudinal plan view of the axle spindle depicted in FIG. 16.
Figure 18:
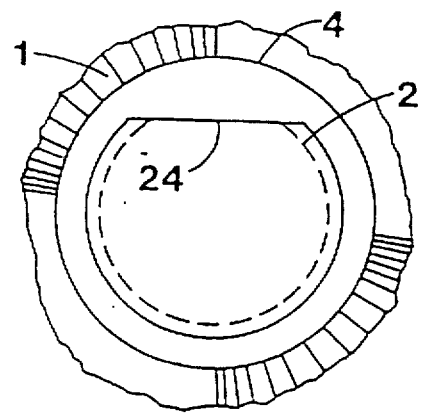
FIG. 18 shows an end view of the milled axle spindle illustrated in FIG. 17.

With regard to the above-described third and fourth alternate embodiments, it is to be understood that this system is not restricted to use with a washer 32 having an inner projection 44. This system can be also used on a milled flat axle as shown in FIGS. 16–18 with the "D" washer shown in FIGS. 19 and 20, because the "D" washer prevents rotational movement of the washer relative to the axle spindle.

Application of the principles of this invention described for the preferred embodiment and the alternate embodiments makes it possible to standardize the wheel retention systems on tractor/trailer combination vehicles providing control of tapered roller bearing preload at the three axle positions on the vehicle; the steer axle of the tractor, the drive axles of the tractor, and the axles of the trailer.

Although the present invention is primarily concerned with the means for applying a definitively controlled preload force on the tapered roller bearings, another purpose can be served. There is still an interest on part of many vehicle operators to install wheels on their tractor/trailer combination vehicles providing some actual clearance between the adjustment nut and the outer face of the outer bearing before securing the wheel assembly on the axle. This procedure is easily accomplished by backing off the adjustment nut for a measured distance from the position where resistance to installation torque is first sensed before installing the threaded lock ring or retainer member. Guidelines for doing this are well defined in recommended practices and industry standards.

Despite the principles of this invention having been described for application on tractor/trailer combination vehicles, it is visualized any automotive vehicle will benefit by having wheels similarly mounted on their axles.

While preferred embodiments of the present invention are shown and described, it is envisioned that those skilled in the art may devise various modifications of the present invention without departing from the spirit and scope of the appended claims.

The invention claimed is:

1. An axle nut system for preloading roller bearings comprising:
   an axle having roller bearings mounted thereon, said axle having an end portion, said end portion having threads thereon of a predetermined pitch which include outboard thread faces and inboard thread faces;
   an inner member having threads thereon of a predetermined pitch being mounted on said end portion of said axle, said inner member abutting against at least a portion of said bearings and establishing a compressive preload on said bearings;
   an intermediate member mounted on the end portion of said axle and abutting against said inner member, said intermediate member being fixed against rotation relative to said end portion of said axle;

an outer member mounted on said end portion of said axle and abutting against said intermediate member, said outer member being connected to said end portion of said axle to prevent outward movement of said inner member and said intermediate member when said inner member is rotated in an opposite direction to which said inner member was initially rotated with respect to said axle during which said inner member threads are engaged with said inboard thread faces of the axle threads so that said inner member becomes tightly immovable with respect to the intermediate and outer members while retaining the compressive preload condition on said bearings.

2. An axle nut system as defined in claim 1, wherein said intermediate member comprises a washer having means associated therewith for preventing relative rotational movement between said washer and said end portion of said axle.

3. An axle nut system as defined in claim 2, wherein said means for preventing relative rotational movement between said washer and said end portion of said axle comprises a projection which engages within a keyway on said axle.

4. An axle nut system as defined in claim 1, wherein said outer member comprises a retainer ring threadedly engaged with said end portion of said axle.

5. An axle nut system as defined in claim 1, wherein said outer member comprises a nut threadedly engaged with said end portion of said axle.

6. An axle nut system as defined in claim 1, wherein said outer member further includes means associated with said outer member for preventing relative rotational movement between said outer member and said end portion of said axle.

7. An axle nut system as defined in claim 6, wherein said means associated with said outer member for preventing relative rotational movement between said outer member and said end portion of said axle comprises a set screw which is engaged through a hole and bears against said intermediate member.

8. An axle nut system as defined in claim 1, wherein said outer member has a diameter which is less than a diameter of said inner member.

9. An axle nut system as defined in claim 1, wherein said outer member has a smooth outer surface.

10. An axle nut system as defined in claim 1, wherein said outer member has an outer surface having means thereon for engagement by a tool.

11. A method of providing a preload compressive condition on an axle comprising the steps of:
providing an axle having roller bearings mounted thereon, said axle having an end portion, said end portion having threads thereon of a predetermined pitch which include outboard thread faces and inboard thread faces;
placing an inner member having threads thereon of a predetermined pitch on said end portion of said axle;
establishing a compressive preload on said bearings by rotating said inner member against said bearings;
placing an intermediate member on said end portion of said axle, said intermediate member being fixed against rotation with respect to the end portion of said axle;
moving said intermediate member into engagement with said inner member;
placing an outer member on the end portion;
moving said outer member into engagement with said intermediate member, said outer member defining a spacing between said outer member and said bearings which is provided by said inner and intermediate members;
retaining said inner member against retrograde axial movement while retaining the compressive preload condition on said bearings by rotating said inner member in an opposite direction to which said inner member was initially rotated with respect to the axle by engaging said inner member thread with said inboard thread faces of the axle threads so that said inner member becomes tightly immovable with respect to the intermediate and outer members while retaining the compressive preload condition on said bearings.

12. A method as defined in claim 11, further including the step of securing said outer member with respect to said axle to prevent said outer member from rotating with respect to said axle when said inner member is rotated in said opposite direction to which said inner member was initially rotated.

13. A method as defined in claim 11, wherein said step of moving said outer member into engagement with said intermediate member comprises finger tightening said outer member into contact with said intermediate member.

14. A method as defined in claim 11, wherein said step of moving said outer member into engagement with said intermediate member comprises rotating said outer member against said intermediate member with an amount of torque less than the amount of torque applied initially to tighten the inner member.

15. A method as defined in claim 11, wherein said step of establishing a compressive preload on said bearings by rotating said inner member against said bearings is performed by rotating said inner member with a torque wrench.

16. A method as defined in claim 15, wherein said step of rotating said inner member in an opposite direction to which said inner member was initially rotated with respect to the axle is performed by rotating said inner member with a torque wrench.

17. A method as defined in claim 16, wherein during said step of rotating said inner member with a torque wrench in an opposite direction to which said inner member was initially rotated with respect to the axle, said outer member is not contacted with said torque wrench because said outer member has a diameter which is less than a diameter of said inner member.

18. A method of providing a preload compressive condition on an axle comprising the steps of:
providing an axle having inner and outer roller bearings mounted thereon, said axle having an end portion, said end portion having threads thereon of a predetermined pitch which includes outboard threads and inboard threads;
placing inner means on the end portion of said axle, said inner means comprising a nut having threads thereon of a predetermined pitch and a member fixed against rotation relative to said end portion of said axle;
establishing a compressive preload on said outer roller bearing by moving said inner means against said outer roller bearing to apply a predetermined amount of thrust force against said outer roller bearing, said nut being moved by rotating said nut in a first direction;
placing a lock member on said end portion for securing said inner means on said axle by moving said lock member into an abutting position with said inner means without increasing the compressive preload on said outer roller bearings; and
rotating said nut in a second direction opposite to said first direction with sufficient torque to cause a jammed condition of said nut within said assembly.

19. A method as defined in claim 18, wherein the step of placing said lock member on said end portion comprises finger tightening said lock member on said end portion until said lock member abuts against said inner means.

20. A method as defined in claim 18, wherein said lock member comprises a nut.

* * * * *